INVENTOR.
RAYMOND A. SCHULZ
BY George J. Hetter
ATTORNEY

United States Patent Office 3,148,366
Patented Sept. 8, 1964

3,148,366
ANALOG TO DIGITAL CONVERTER

Raymond A. Schulz, Endicott, N.Y., assignor to International Business Machines Corporation, New York, N.Y., a corporation of New York Filed Dec. 24, 1962, Ser. No. 246,712
3 Claims. (Cl. 340—347)

The present invention relates to an analog to digital converter, and more particularly to such a converter relying on pulse-duration modulation as a basic principle of operation.

In recent years it has become increasingly important in data processing systems, computers and the like to provide highly accurate and fast means for converting information available in a relatively continuous signal state to a digital form which is conventionally termed analog to digital conversion. The over-all importance of such an operation is clear even though it stems from a number of different sources. For example, as a result of the ever increasing accuracy requirements in measuring techniques and in order not to dissipate this accuracy, it is desirable to convert information in analog form to a pulse condition which theoretically offers a much higher degree of processing accuracy. This is particularly true where extended mathematical calculations are entered into using the analog information as a basis.

In its most generalized consideration, such a conversion amounts to providing a train of pulses having a coded arrangement corresponding to the variations of some physical quantity. There are many different presently known approaches to obtaining such conversion, such as, to mention but a few, ramp voltage converters, stair case encoders, successive approximation converters, shaft angle converters and phase shift coders. Each of these systems or approaches has advantages and disadvantages depending on the particular use to which it is put, cost requirements imposed, and accuracy or speed of response desired.

A further class of converters which offers considerable theoretical advantage in the way of accuracy are those relying on the modulation of electric signal pulses as a basic functional technique. Of most pertinence here are such apparatus utilizing what is termed "pulse-duration" modulation (PDM) as distinguished from pulse-code modulation, pulse phase modulation, and the like.

Without reference to detailed structure, the term pulse-duration modulation refers to that modulating technique in which a modulating wave effects a corresponding variation of the time of occurrence of the leading edge, the trailing edge, or both the leading and trailing edges of an electric signal pulse. By analogy, whereas in amplitude modulation information is impressed upon a carrier wave to modify the magnitude of its amplitude, here the leading and/or trailing edges of pulses of known, and otherwise constant, characteristics are changed relative to a basic time reference thereby providing pulses the width or duration of which are a coded representation of some physical quantity. More particularly, a plurality of cyclically recurring pulses provided in serial relation to one another have their respective widths changed corresponding to an associated portion of an analog quantity signal such that each so modified pulse is in effect a sample of the original signal and the complete train of such modulated pulses represents a coded manifestation of the entire analog signal information. By appropriate actuation of a clock pulse generator under the time control of the duration of the modified pulses a digital representation or count of the original analog quantity is obtained which can be processed by a digital computer with the advantages noted.

It is therefore a primary object of the invention to provide an analog to digital converter of exceptional accuracy.

A further object of the invention is to provide such an apparatus utilizing pulse-duration modulation as a basic operational principle.

A still further object is the provision of such apparatus including digital to analog feedback means for drift compensation.

Another object is the provision of an analog to digital converter employing conditional feedback.

A still further object is the incorporation in such apparatus of round-off error compensating means.

The foregoing and other objects, features and advantages of the invention will be apparent from the following more particular description of a preferred embodiment of the invention, as illustrated in the accompanying drawings.

Briefly, in the practice of the invention there is provided an analog to digital apparatus in which an analog quantity existing as an electric signal is used to modulate the width or duration of a train of pulses. A second train of pulses is gated into a counter under the time control of the modulated pulses for providing a digital result continuously representative of the analog quantity. A digital to analog circuit converts the modulated pulses into a feedback signal to compensate for systemic drift, and other errors, by a conditional feedback circuit.

Figure 1:
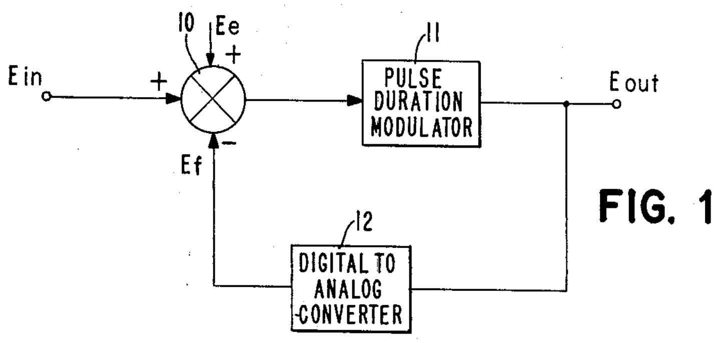
FIGURE 1 illustrates in block diagram form the converter of the invention in its most generalized aspect.

Concerning the more generalized functional and theoretical aspects as illustrated in the block diagram of FIGURE 1, the analog voltage E*in* to be transformed into digital form is fed into a mixing means 10 indicated as being additive (+). The other addends to the means 10 are, E*e* representative of errors resulting from drift or delayed switching of the converter apparatus, and E*f* a feedback voltage which ideally completely nullifies the effect of E*e*. The summed voltage having substantially the identical character of E*in* is fed from the means 10 into a pulse duration modulation 11 which is represented in later equations as having an amplification factor P. The pulse signals modulated in accordance with the character of the analog signal by the modulation 11 is termed E*out*, which although not in the form of a train of pulses can be considered as a "digital" signal in the discussion that immediately follows relative to the generation of the feedback signal E*f*. In a special way that will be set forth later herein E*out* is transformed by a digital analog converter 12 into the feedback analog signal E*f* of such character as to remove drift and other effects to within a high degree of accuracy when summed in the means 10. In subsequently presented mathematical expressions the amplification factor of the converter 12 is referred to by the letter D.

Representing the operational features of the invention in mathematical symbology, it can be shown that:

$$Eout=\frac{P(1+D)}{1+PD}\,Ein+\frac{P}{1+PD}\,Ee$$

Moreover, if P is established as close as possible to unity (1) then the preceding equation can be simplified to:

$$Eout = Ein + \frac{Ee}{1+D}$$

Implicit from the above analysis is that when D is sufficiently large the effect of E*e* can be reduced to a negligible amount. In fact, it is considered that an analog to digital converter made in the manner described herein can achieve an accuracy in the order of ten (10) parts per million.

Figure 2:
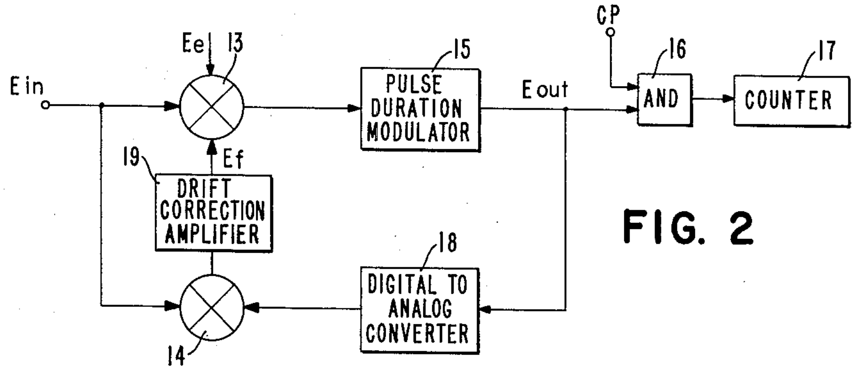
FIGURE 2 illustrates the converter of FIGURE 1 in partial detail, particularly showing the overall-operational relationships.

Enlarging the scope of attention to include a complete converter in generalized block form, reference should now be made to FIGURE 2. The analog voltage E*in* is simultaneously fed into a pair of mixing means 13 and 14. In the means 13 the analog signal is summed with a feedback signal E*f* to provide a drift corrected signal to a pulse duration modulator 15, that is, E*f* is of such character as to compensate completely for the error voltage E*e*.

The modulated pulses E*out* actuate an AND gate 16 which provides a controlled presentation of clock pulses from a generator CP to a counter 17. As a result of this, a counting function only takes place during the pulse existence, that is, when the modulated pulses are in an up condition thereby providing the required relationship of the count set into the counter to the analog signal E*in*.

Generation of the feedback E*f* is accomplished by transforming E*out* through the action of a digital to analog converter 18 into analog form, summing this signal with E*in* in mixing means 14, and amplifying the summed signal via drift correction amplifier 19 to provide the desired E*f*. As will be more explicitly set forth in the description of a preferred embodiment that immediately follows, the feedback apparatus is of a special kind which serves to enhance to a considerable degree the superior characteristics of the pulse duration technique of this converter, particularly in regard to accuracy.

Figure 3:
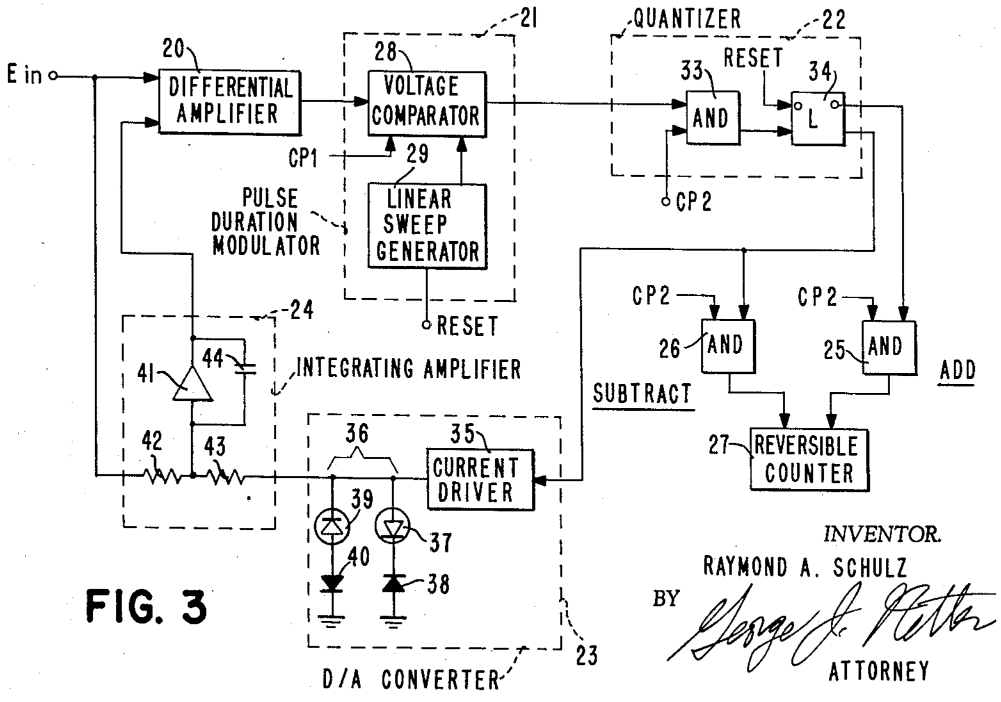
FIGURE 3 is a functional block diagram of the novel converter.

FIGURE 3 shows in functional block form, with some additional detail of structure, a preferred form of an analog to digital converter made in accordance with the practice of the invention. In its major elements it comprises a differential amplifier 20, a pulse duration modulator 21, a quantizer 22, a digital to analog converter 23, a feedback integrating amplifier 24, counting AND gates 25 and 26, and a reversible counter 27.

Operation in gross includes presenting the analog signal E*in* and feedback signal E*f* to the amplifier 20 to form a summation signal that is pulse modulated by the modulator 21. The modulated pulses provide a corresponding intermittent train of pulses via the quantizer 22 which is entered through respective ADD and SUBTRACT gates 25 and 26 as the case may be into the reversible counter 27. Also, the quantizer ADD signal is transformed by the D/A converter 23 into analog signal form which is in turn amplified by the integrating amplifier 24 providing the feedback voltage signal, E*f*.

The differential amplifier 20 can be a D.C. amplifier of moderate quality with a pair of input means for accepting both E*in* and E*f*, and as such is equivalent to the mixing means 10 and 13 of FIGURES 1 and 2. An excellent amplifier for this purpose is described in the article entitled "The Emitter-Coupled Differential Amplifier," by D. W. Slaughter, in Transactions IRE, PGCT, vol. CT–3, No. 1, page 51, March 1956.

Figure 4:
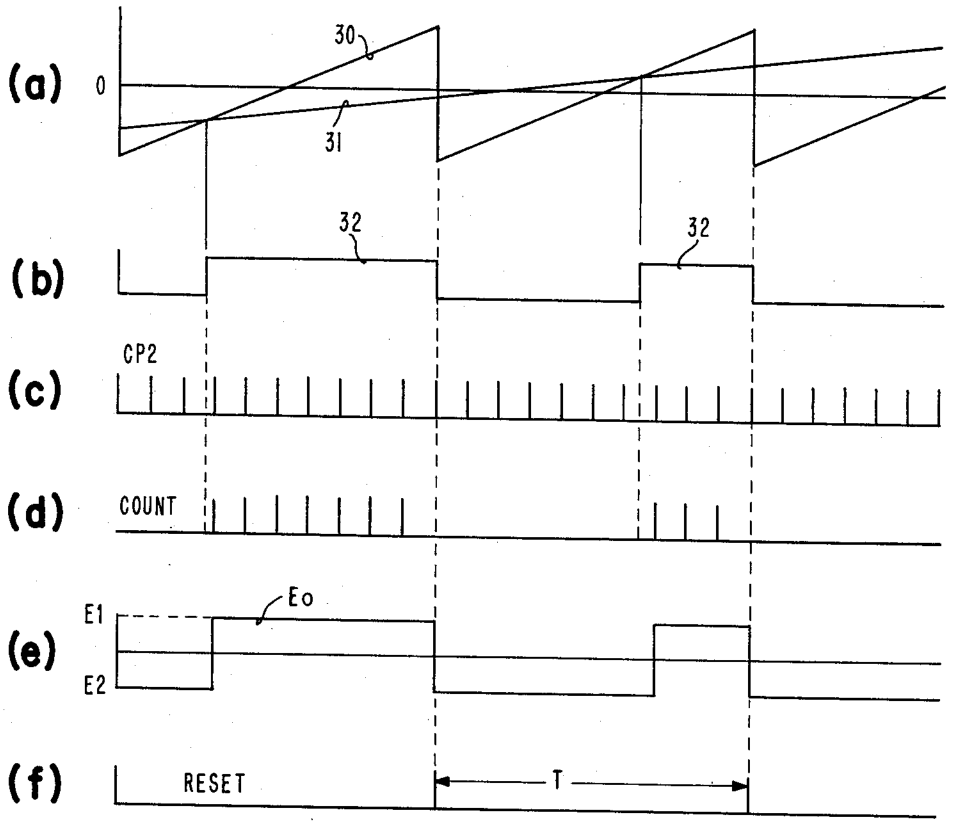
FIGURE 4 is a timing graph of various signals available at different points in the conversion apparatus of FIGURE 3 illustrating their mutual timing relation to one another.

The pulse duration modulator 21 comprises a voltage comparator 28 for comparing the summed signal from the amplifier 20 against a saw-tooth sweep voltage provided by a linear sweep generator 29. As illustrated in FIGURES 4*a* and *b*, the saw-tooth sweep voltage 30 when combined with the summed output of amplifier 20 (shown as a steadily rising voltage 31) is transformed into a train of rectangular pulses 32 by the comparator 28. Specifically the pulses 32 are at an up-level during those times that the sweep voltage 30 is greater (more positive, here) than the voltage 31. Conversely, the comparator output is at a down-level for those periods of time when the sweep voltage is more negative than E*in*, and is initiated here by the vertical portion of the sweep voltage 30. This production of pulses having controlled widths directly dependent on the comparative values of the sweep and corrected analog voltages is what has been referred to previously herein as pulse width, or pulse duration, modulation.

Figure 5:
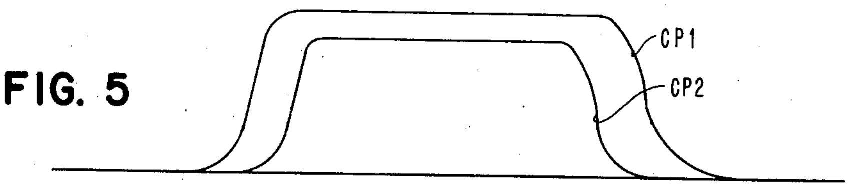
FIGURE 5 is a graphical representation of the relative times of controlling effect of two control pulses.

A satisfactory comparator circuit is provided by the Schmitt trigger illustrated and described in detail in FIGURE 5.17 and pages 164–165 of the text "Pulse and Digital Circuits," by J. Millmann and H. Taub, published by McGraw-Hill Book Company, Inc., New York.

For a purpose that will be made clearer below in the discussion of the timing and control of the gates 25 and 26, a series of control pulses from a clock pulse generator CP1 serve to inhibit operation of the comparator during the up condition of the clock pulses. It is the general purpose of this control to prevent switching of the comparator at times incompatible with other operations of the total apparatus.

RESET control pulses (FIGURE 4*f*) are provided from a computer, or other collateral equipment, in a selective manner and serve as the fundamental control mechanism, that is, initiate operation, stop operation and determine sampling rate. The reset pulses are illustrated as coincident with the vertical portions of the saw-tooth voltage 30, the period of which, T, is referred to herein as the gate period.

Quantizer 22 comprises an AND gate 33 and a latch (L) 34. The pulses from the comparator control the AND gate 33, the other gate input consisting of timing pulses provided by a clock pulse generator CP2 (FIGURE 4*c*). With coincidence of inputs to the gate 33 a signal is available to set up the latch 34, the up side of which provides corresponding signals to the SUBTRACT gate 26. Reset of the latch, on the other hand, serves to actuate it to the down-level (illustrated by the circled terminal) supplying actuation signals to the ADD gate 25. CP2 also controls both gates 25 and 26.

With reference now particularly to FIGURES 4*c* and *d*, it is seen that during the time the rising sweep voltage 30 exceeds the summed signal 31 from the amplifier 20 the comparator is set to the up condition which actuates AND gate 33 at CP2 time setting the latch to the up condition. This actuates the SUBTRACT gate 26 to enter the pulse train CP2 into counter 27. The SUBTRACT count continues until the modulated pulse 32 goes to the down level, at which time the latch 34 is then switched to the down level by the reset pulse and an ADD count begins. It is clear that the difference or net count in the counter 27 for each gate period (shown on the graphs as the distance T) represents the net pulse width or duration for the corresponding time period, and, accordingly, the corresponding part of the analog quantity E*in*.

Acceptable examples for use as the AND gates 25, 26 and 33 and for the latch 34 are set forth in FIGURE 15.68, pages 15–66, and FIGURE 15.52, pages 15–52, respectively, of the "Handbook of Semiconductor Electronics," L. P. Hunter, published by McGraw-Hill Book Co., Inc., New York 1956.

A pair of suitably connected counters, such as Model 7370 R, Universal Eput and Timer, manufactured by Beckman/Berkley, satisfactorily provide the required functions of the counter 27.

As referred to before, CP1 inhibits switching of the comparator for a specified period of time. More precisely, as shown in FIGURE 5, the relationship of the CP1 and CP2 clock pulses are such that all CP2 pulses are encompassed by a corresponding CP1 pulse. This achieves the desired result of preventing the comparator from switching during the CP2 pulse which could result in lost counts for the counter 27 strongly affecting the accuracy of conversion.

The D/A converter 23 includes a current driver 35 and a temperature compensated voltage regulation circuit 36. Driver 35 is essentially a constant current source which is actuated by up-level signals from the latch 34 to deliver current to the circuit 36. For this purpose the current driver set forth and described in detail in FIGURE 12.27, page 432 of the text "Transistor Circuit Engineering," by R. F. Shay, published by John Wiley and Sons, Inc., New York, May 1958, is fully satisfactory.

Precisely regulated voltage signals are provided by the regulation circuit 36 acting on the current driver output. This circuit includes a first series path of a first Zener diode 37 having its cathode terminal connected to the cathode of a diode 38, the anode of the latter diode referenced to ground. A second series path is provided consisting of a second Zener diode 39 having its anode connected to the anode of a diode 40, the latter having its cathode ground referenced. The anode of the diode 37 and the cathode of diode 39 serve both as a common connection point with current provided by the driver 35 and as an output line to the integrating amplifier 24. The voltage developed across the regulator 36 is indicated as E0 (FIGURE 4*e*).

Zener diodes for obtaining the maximum advantages possible from the practice of the invention should be the so-called temperature compensated units which actually consist of a series combination of a silicon diode and Zener diode, described above as first and second series paths of the circuit 36. Units of this general type are manufactured and sold under the commercial designation 1N945 by Motorola, Inc., and offer voltage change with temperature of as little as 0.0005 volt D.C. per degree centigrade.

Also, as FIGURE 4*e* explicitly shows, the uppermost (E1) and lowermost (E2) extents of the voltage E0 are maintained uniform to within a high degree of accuracy. To illustrate the order of effect of these voltages E1 and E2 on the signal E0, and, of course, the effect of inaccuracies or errors in the same voltages, the following equation mathematically relates these factors with certain others:

$$E_0(\text{D.C.})=\left[1-\frac{\left(1+\frac{\Delta T}{T}\right)\left(1-\frac{E1}{E2}\right)}{2}\right]E2$$

where T is the gate period and ΔT represents the difference in count between the negative and positive portions of E0.

Integrating amplifier 24 includes a D.C. operational amplifier 41 having a pair of separate resistance input lines 42 and 43 and capacitance feedback provided via capacitor 44. The analog voltage E*in* is presented to the amplifier 41 via resistance 42 and E0 by means of resistance 43. Capacitance feedback of the operational amplifier acts to integrate the two analog voltages which, because of their relative polarities, results in integration of the difference between the two analog voltages, that is, E*in*–E0. It is this integral which is the feedback signal E*f*, previously discussed.

The integration aspect of the integrating amplifier 24 has several effects on the operation of the invention that are of considerable importance, particularly in the interests of accuracy. First of all, it serves as a means of overcoming the effects of drift that may occur in the comparator 28, differential amplifier 20, or sweep generator 29, for example. Secondly, net round-off errors that result on a quantizing are integrated to provide full increments of compensation, or, expressed slightly differently, although quantization errors for each gate period are not compensated for on an individual basis their total effect is accounted for through integration. Thirdly, the integrator serves as a filter for the gate frequency, components and harmonics of the pulse duration modulator. It is clear, therefore, that the operational amplifier 41 must be of high quality since any error it contributes is not removed by the system.

Although in the foregoing description attention has been focused solely on that apparatus for transforming an analog signal into digital form and storing a corresponding digital count in a counter, apparatus of this general type is usually used in conjunction with a digital computer which utilizes the digitized information obtained from the converter for other purposes, and the converter set forth herein possesses equal advantages and merit in that environment, also.

While the invention has been particularly shown and described with reference to a preferred embodiment thereof, it will be understood by those skilled in the art that various changes in form and details may be made therein without departing from the spirit and scope of the invention.

What is claimed is:

1. Analog electric signal digitizing apparatus, comprising:

means actuated by the analog electric signal for producing a train of pulses, each pulse modulated to produce a coded condition thereof identifying it with a corresponding portion of the analog signal;

a quantizer fed by the modulated pulses and actuated thereby to provide counting pulses the number of which is directly related to the coded condition of the actuating pulses;

a counter electrically connected for receiving and storing the counting pulses supplied by the quantizer;

digital to analog conversion means fed by the counting pulses for providing an analog signal corresponding to the count thereof;

integrating means electrically connected to both analog signals for forming a feedback signal representative of the integral of the difference of said analog signals; and interconnection means relating the integrating means and producing means for presenting the feedback signal to said producing means.

2. Apparatus for transforming a continuous electric signal representative of some physical quantity into coded digital form corresponding thereto, comprising:

asymmetric pulse generating means actuated by said signal for providing a train of pulses having individual characteristics identifying them with corresponding portions of the signal;

means electrically connected to the pulse generating means and actuated by the pulses for forming and storing a numerical count representative of said pulse characteristics;

means connected to receive the count for converting the same to an analog signal of coded duration and precise constant magnitude extents;

an integrator connected to receive the representative electric signal and the coded analog signal for providing a signal that is the integral of the difference of the said signals; and means for presenting the integral difference signal to the pulse generating means thereby serving as feedback compensation for system drift errors.

3. Apparatus for transforming as in claim 2 in which the converting means includes a constant current source actuated by the numerical count to provide a current signal, and a pair of temperature compensated Zener diode circuits arranged in shunting relation to said current signal and individually poled to act as a means of providing a regulated voltage signal.

References Cited in the file of this patent

UNITED STATES PATENTS

| | | |
|---|---|---|
| 3,028,550 | Naydan et al. | Apr. 3, 1962 |
| 3,042,911 | Paradise et al. | July 3, 1962 |